Figure 1:
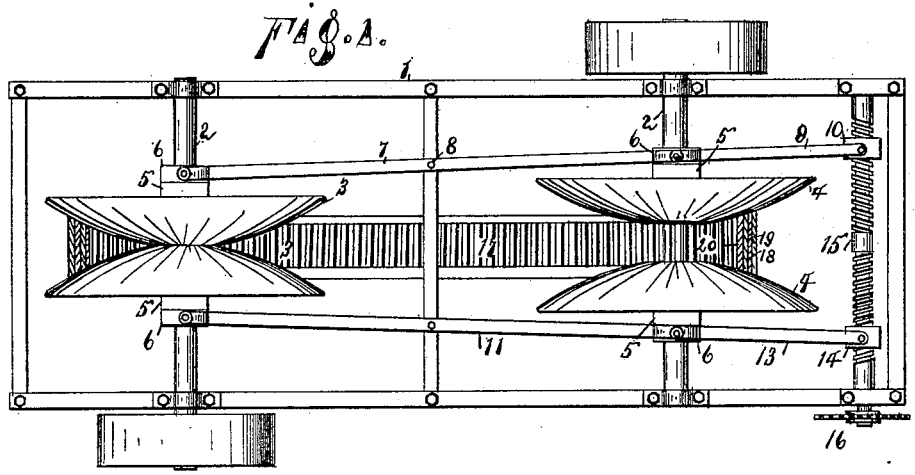

(No Model.)

M. O. REEVES.
SPEED VARYING MECHANISM.

No. 583,402.          Patented May 25, 1897.

Witnesses
Ernest K. Hood
Thomas D. Corry

Inventor
Milton O. Reeves,
By Attorney
George B. Parkinson.

UNITED STATES PATENT OFFICE.

MILTON O. REEVES, OF COLUMBUS, INDIANA, ASSIGNOR TO THE REEVES PULLEY COMPANY, OF SAME PLACE.

SPEED-VARYING MECHANISM.

SPECIFICATION forming part of Letters Patent No. 583,402, dated May 25, 1897.

Application filed October 12, 1896. Serial No. 608,552. (No model.)

*To all whom it may concern:*

Be it known that I, MILTON O. REEVES, a citizen of the United States of America, residing at Columbus, in the county of Bartholomew and State of Indiana, have invented certain new and useful Improvements in Speed-Varying Mechanism, of which the following is a specification.

The ordinary cone of pulleys is the most common speed-varying mechanism in use, but its defects are well recognized. Among the many attempts to better the art devices have been constructed consisting of pairs of truncated cone-shaped disks, each pair feathered to a shaft with their small ends facing each other, so as to present a deep V-shaped groove between them. The corresponding members of each pair were so connected that as the members of one pair were moved away from each other the members of the other pair were moved toward each other. A bevel-edged driving-belt was stretched between the pairs of disks, and as the disks of one pair were moved apart the belt moved nearer the shaft, thus working on a smaller driving diameter, and the disks of the other pair moved toward each other and the belt assumed a position within the latter pair at a greater driving diameter, thereby varying the speed of one shaft relatively to the other. The theoretical advantages in this arrangement are recognized, but certain practical defects have prevented its use. It was found that when the belt was tight between a large driving diameter and a small diameter it would be loose when working at diameters between the large and small one. This is due to the fact that the belt in working from a large to a small diameter contacts with more than half of the large pulley and relatively less of the small, while the belt working on equal diameters passes around half of each. Comparing two pulleys one larger than the other with two pulleys each of a diameter equal to the mean diameter of the other two, the two of unequal size will require a belt longer by about one-half of the excess of belt contact on the large pulley above one hundred and eighty degrees minus one-half of the deficit of belt contact on the smaller pulley under one hundred and eighty degrees, and the excess increases as the distance between the pairs of pulleys decreases, and vice versa.

The object of my invention is to overcome this defect and maintain a uniform tension on the belt; and the invention consists in substituting for the cone-disks disks of the cone order having their driving-faces bulged or convexed in such manner as to automatically take up or let out slack as the driving diameters of the disks recede from or approach the mean diameter.

Figure 2:
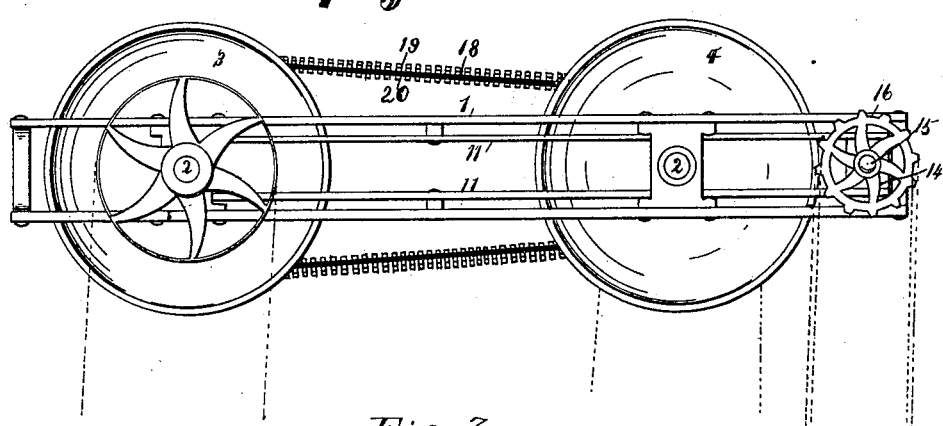
Figure 3:

In the drawings, Figure 1 is a plan, and Fig. 2 a side elevation. Fig. 3 is an end section of the belt.

Mounted in a frame 1 are two parallel shafts 2, one being the driving and the other the driven shaft. 3 and 4 are pairs of disks in the form of oblate spheroids and are feathered, respectively, to one of the shafts 2 with their smaller bases facing each other, so as to present a deep curved V-shaped groove between the pairs. Each disk is provided with a hub 5, adapted to contact with sleeves or collars 6, movably mounted on the shafts. The collars contacting with one member of each pair of disks are connected by a lever 7, pivoted half-way between the shafts at 8 and having an end 9, carrying a threaded collar 10. The collars contacting with the other member of each pair are connected by a lever 11, similar to lever 7 and similarly pivoted and provided with an end 13, carrying a threaded collar 14. Passing through the threaded collars 10 and 14 is a screw-shaft 15, having a right-hand-threaded portion and a left-hand-threaded portion, each adapted to coöperate with one of the threaded collars and move them simultaneously when the shaft is rotated either toward or away from a common point. The outer end of screw-shaft 15 is provided with a sprocket-wheel 16, adapted to be rotated by a suitable chain. When the screw-shaft is rotated, the members of one pair of disks are moved apart, while the members of the other pair are moved toward each other. Stretched between the pairs of disks is a belt 17, preferably provided with beveled driving edges adapted to contact with the driving-faces of the disks. The belt preferably consists of a continuous strip 18, having lateral strips 19 secured to one side and lateral strips 20 secured to the other side, thus making a belt rigid in cross-section and flexible longitudinally. As the disks of one pair move apart the belt moves nearer the shaft, thus reducing the driving diameter of the pulley, and simultaneously the other pair of disks move toward each other, and the belt moves on the disks to a greater driving diameter, thus varying the speed of one shaft relatively to the other. The curvature of the disks automatically compensates for the different lengths of belt required, and the belt is kept at a uniform tension.

I claim—

1. The combination, in a speed-varying mechanism, of a shaft, a pair of driving elements movably mounted thereon having oblate spheroid driving-faces; a second shaft; a pair of driving elements of like construction thereon, a belt connecting the pairs of driving elements and having driving edges conforming to the oblate spheroid driving-faces, and means for simultaneously moving the members of one pair of driving elements toward each other, and the members of the other pairs away from each other, substantially as and for the purpose set forth.

2. The combination, in a speed-varying mechanism, of a shaft, a pair of driving elements movably mounted thereon having oblate spheroid driving-faces, a second shaft, a pair of driving elements of like construction thereon, a belt connecting the pairs of driving elements, and having driving edges conforming to the oblate spheroid driving-faces, levers connecting the corresponding members of each pair, pivoted between the shafts and having extensions in the rear of one shaft, a screw-shaft having a right-hand-threaded part and a left-hand-threaded part, each carrying a nut adapted to engage with the extensions of one set of levers, substantially as and for the purpose set forth.

MILTON O. REEVES.

Witnesses:
  H. L. PEARSON,
  JNO. JEWELL.